B. HAWKINS.
Jack or Dresser Spool.

No. 214,037.  Patented April 8, 1879.

Witnesses
Charles E. Harwood
S. N. Piper

Inventor
Benoni Hawkins
by attorney,
R. H. Eddy

UNITED STATES PATENT OFFICE.

BENONI HAWKINS, OF WOONSOCKET, RHODE ISLAND.

IMPROVEMENT IN JACK OR DRESSER SPOOLS.

Specification forming part of Letters Patent No. 214,037, dated April 8, 1879; application filed January 22, 1879.

*To all whom it may concern:*

Be it known that I, BENONI HAWKINS, of Woonsocket, of the county of Providence and State of Rhode Island, have invented a new and useful Improvement in Jack or Dresser Spools; and do hereby declare the same to be described in the following specification and represented in the accompanying drawings, of which—

Figure 1:
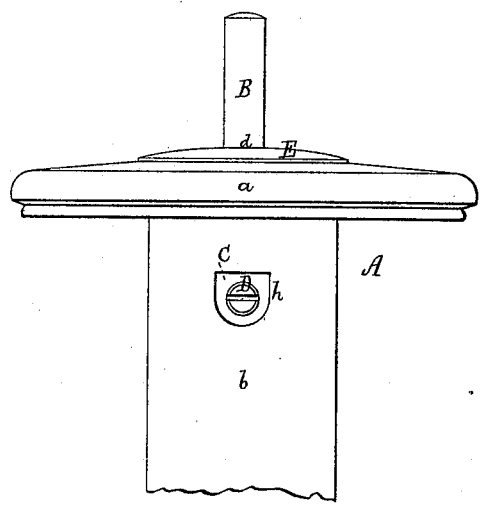
Figure 2:
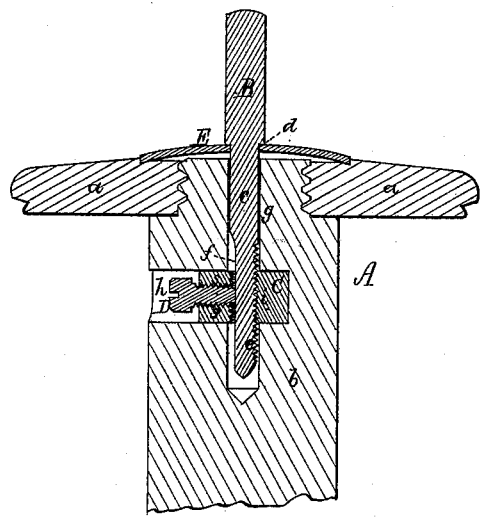

Figure 1 is a front elevation, and Fig. 2 a longitudinal section, of a jack-spool head and part of the body as provided with my invention; the object of which is to effect a secure and durable fastening of the journal to the body of the spool, and thereby overcome or prevent what frequently happens—viz., the working loose in their sockets of the journals of jack or dresser spools.

In carrying out my improvement, I construct the shank of the journal flat on one side along its screw, and provide the nut with a female and a male screw, to co-operate with the flattened part of the shank in preventing the journal-screw from working loose on the nut.

In the drawings, A denotes part of a jack-spool, or one head, a, and a short part of the body b thereof.

Figure 3:
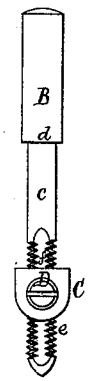
Figure 4:
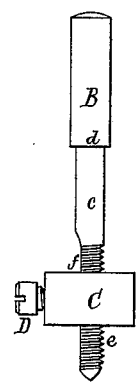

The journal B, projecting from the head, is provided with a shank, c, which extends down from the foot or shoulder d of such journal, and has cut on it a male screw, e. Furthermore, one side of the shank along the screw is flattened, as shown at f in Figs. 3 and 4, which are side views of the journal and its sustaining devices as separate from the spool.

The shank of the journal extends into a socket, g, in the head and body of the spool, and screws into an elongated nut, C, placed within and fitting to a chamber, h, made transversely in the body. Besides its female screw i to receive the shank, the nut has another or auxiliary female screw, s, leading from the screw i to one end of the nut; and there is screwed into the lesser or auxiliary female screw s a male or set screw, D, having a nicked head, all being arranged as represented. The journal-shank goes through a metallic disk, E, applied to the head of the spool, the shoulder of the shank being against the said disk.

On screwing the shank down into the nut until the shoulder may come into contact with the disk, and the flat part of the shank may be next the point or inner end of the set-screw, and screwing the said set-screw firmly up against such flat part, the journal will be strongly held in place, and cannot work loose or its shank revolve in the nut.

In my fastening, it will be seen that the set-screw, by being in the nut and working against the flat part of the journal-shank, acts on the nut so as to draw it hard up to the screw, while the flat part of the shank, in connection with the set-screw, operates to prevent the screw from revolving.

I claim—

The jack or dresser spool A, having the disk E and the parts a b, and recessed, as shown at g h, in combination with the journal B, provided with the shoulder d and flattened shank, as represented, and with the stationary rest C, having the two female screws and the fastening-screw D, all being arranged and applied substantially as set forth.

BENONI HAWKINS.

Witnesses:
 DAVID BASS,
 ALONZO MOWRY.